April 10, 1951 G. E. FRISZ 2,548,010
SHAFT MEASURING MEANS
Filed Dec. 15, 1945
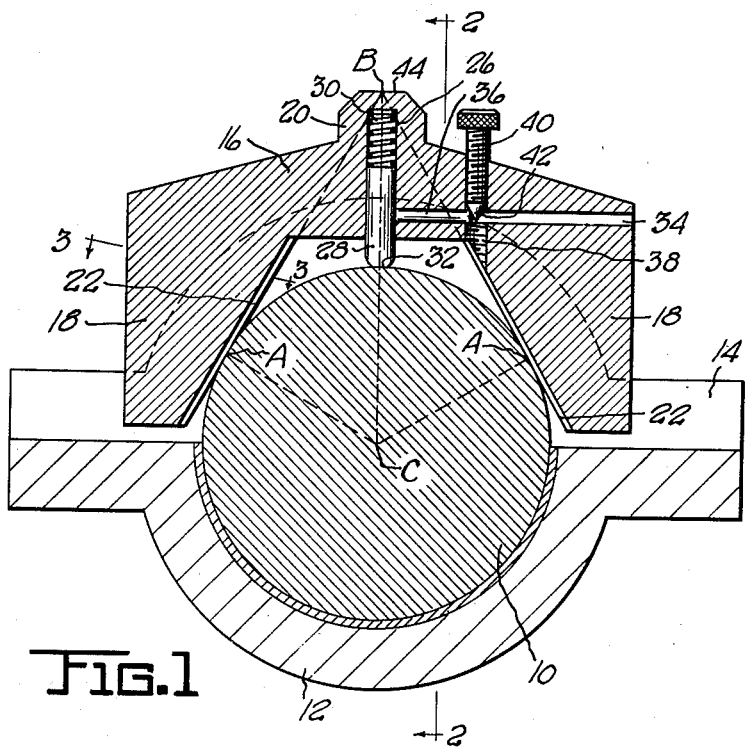
Fig.1
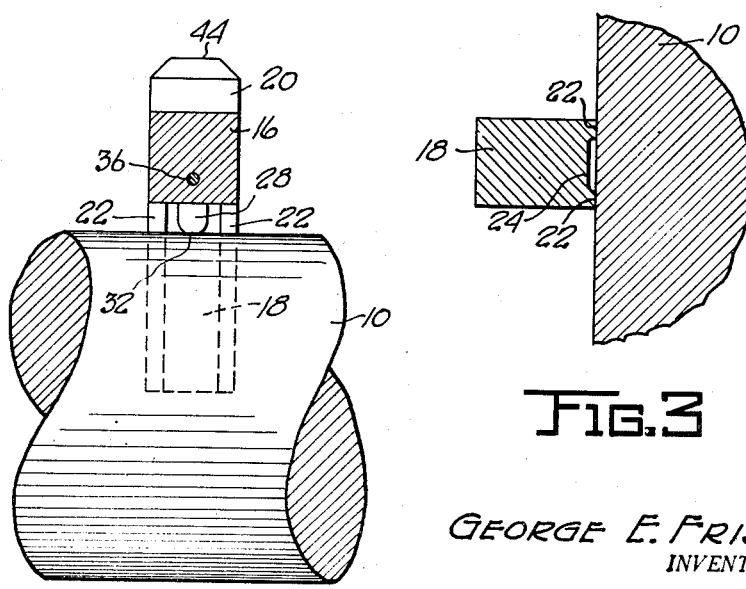
Fig.2
Fig.3
GEORGE E. FRISZ.
INVENTOR.
BY Oltsch + Knoblock
ATTORNEYS.

Patented Apr. 10, 1951

2,548,010

UNITED STATES PATENT OFFICE 2,548,010

SHAFT MEASURING MEANS

George E. Frisz, Clay Township, St. Joseph County, Ind.

Application December 15, 1945, Serial No. 635,259

8 Claims. (Cl. 33—178)

This invention relates to shaft measuring means, and more particularly to means for accurately measuring the diameter of a shaft.

It is frequently necessary to measure the radius or diameter of a shaft of a machine or engine which is being checked or repaired, so as to determine the size of a bearing therefor or for other purposes. Such measurements have heretofore required the removal of the shaft from the machine in order that micrometer measurements could be made at the bearing or journal portions, etc. Such shaft removal requires substantial labor and time and greatly increases the cost of the work. Therefore, it is the primary object of this invention to provide a device for making such measurements without requiring access to diametrically opposed portions of the shaft.

A further object is to provide a simple device of high accuracy for measuring the diameter of a shaft rapidly and easily.

A further object is to provide a device of this character having a frame bridging and engaging a projecting portion of a shaft and characterized by opposed shaft engaging surfaces disposed at an angle of sixty degrees from each other, a transverse surface positioned in the plane equiangularly related to the two shaft engaging surfaces in which lies the line at which said surfaces would intersect if projected, and a plunger equiangularly related to said opposed surfaces and engageable with said shaft, whereby a measurement of the spacing between said transverse surface and the end of said plunger constitutes a measurement of the radius of the shaft.

Other objects will be apparent from the description and appended claims.

In the drawing:

Fig. 1 is a central longitudinal sectional view of the device.

Fig. 2 is a transverse sectional view of the device taken on line 2—2 of Fig. 1.

Fig. 3 is a transverse detail sectional view taken on line 3—3 of Fig. 1.

Referring to the drawing, which illustrates the preferred embodiment of the invention, the numeral 10 designates the shaft to be measured which is adapted to be journaled in a bearing, which is preferably of the split or two-part type including a lower bearing part 12 and an upper part 14. In Fig. 1 is illustrated a lower bearing supporting the shaft at the point at which measurement is to be made, the bearing part 14 shown in Fig. 1 being longitudinally displaced from the point of measurement and constituting a portion of another bearing.

The device comprises a rigid frame 16 of bridge-like form having a pair of spaced integral projecting legs 18, and an upwardly projecting centrally positioned head 20, preferably also integral with the frame. The inner surfaces 22 of the legs are arranged in diverging relation exactly 60° displaced from each other. The accuracy of the surfaces 22 is critical, with respect to both the angle of displacement and the exact linear or planar form of each surface, for which purpose said faces are accurately finished, as by surface grinding. As best shown in Fig. 3, the surfaces 22 are preferably longitudinally centrally grooved at 24 to provide two laterally spaced engagement portions on each leg 18.

The frame 16 has a central bore 26 formed therein centrally between the legs 18 with its axis equi-angularly disposed to the faces 22 of the legs. Within this bore is slidably received a plunger 28 which is normally outwardly urged by a spring 30 within the bore. The outer end of the plunger has a flat transverse central surface portion 32 which is exactly perpendicular to the axis of the plunger.

Frame 16 has a bore 34 therein perpendicular to the bore 26 and communicating with said bore 26 intermediate the ends thereof. This bore 34 slidably receives a pin 36 adapted to bear against and lock the plunger 28 in selected position against the action of the spring. A bore 38 in the frame extends perpendicular to and intersects the bore 34 and receives a screw-threaded member 40 having a tapered portion 42 bearing against the outer end of pin 36. By this construction the pin 36 is forced inwardly into frictional clamping engagement with plunger 28 when member 40 is forced inwardly, and is released from such clamping position when member 40 is backed off from engagement of taper 42 with pin 36.

The projecting head 20 has a surface 44 which is accurately finished, as by surface grinding, in a plane transverse of the axis of bore 26, and exactly perpendicular to the plane bisecting the angle between the opposed surfaces 22. The surface 44 is accurately positioned at the apex of the angle between the surfaces 22, i. e., if the surfaces 22 were projected to intersect, the line of intersection thereof would lie in the surface 44.

In the use of the device, the frame is applied over the portion of shaft 10 which projects from its supporting lower half bearing 12, as shown in Fig. 1. Each leg 18 engages the shaft 10 at a tangent A thereof. The radii A—C from the axis C of the shaft to the tangent points A are displaced exactly 90° from the surfaces 22 of legs 18 by reason of such tangency. The line at which projections of surfaces 22 would intersect if projected, which line coincides with the center of surface 44, has been marked B. Since the angle between A—B—A is 60°, and since the line B—C divides that angle equally, the angle A—B—C is 30°, and the angle B—C—A is 60°. Consequently, two identical triangles each of 30°—60°—90°, are formed between points A—B—C, wherein the side B—C is the hypotenuse of each. It is well known from elementary geometry that in such a triangle, the length of the hypotenuse is exactly two times the length of the shortest leg of the triangle, in other words BC=2AC. If the shaft 10 is of true circular cross-section, which can usually be assumed safely with respect to any shaft portion which has been journaled in a bearing unless previous operation of the machine or engine has indicated a contrary condition, all radii will be equal. Consequently, if the plunger 28 is locked in a position at which it bears against the shaft 10 while the surface 22 of opposite legs 18 simultaneously engage the shaft at points A, the spacing between the surface 32 of the plunger and the surface 44 will be equal to and a measurement of shaft radius, because it is exactly one-half of the hypotenuse B—C.

In practice, if the securing screw 40 is released as the device is being applied to the shaft 10, the pressure of spring 30 will automatically insure a firm end engagement of plunger 28 with shaft 10 when the surfaces 22 engage the shaft. Screw 40 is then re-tightened while this three-point shaft contact is maintained, whereby pin 26 is urged and held in plunger-locking position. The device can then be removed with assurance that the plunger will remain in its measuring position. A micrometer can then be used to measure accurately the spacing between surfaces 32 and 44 as a direct measurement of the radius of the shaft.

It will be observed that the measurement obtained will be accurate for a shaft of any size upon which a three-point contact can be obtained. Therefore, the device has a fairly wide range of measurement, limited only by the required proportioning of the parts, such as the limit of reciprocation of the plunger in its bore in the range which permits locking thereof by pin 36. Hence only a few sizes of the device are required by a mechanic to cover the full range of shaft sizes with which he must deal. Another important feature of the device is that it does not require the use of any complicated calculations from the reading taken in order to determine the desired measurement. This reduces the amount of time required to make a measurement by eliminating need for making computations and also eliminates the possibility of errors in computation.

While the device here illustrated and described is a preferred embodiment of the invention, other embodiments may be made within the spirit of the invention and within the scope of the appended claims.

I claim:

1. A shaft measuring device comprising a rigid frame having a pair of spaced legs adapted to straddle a portion of said shaft and each having a planar inner surface, said leg surfaces being displaced 60° from each other, said frame having a bore equispaced from said legs with its axis equiangularly displaced from said inner leg faces, a plunger slidable in said bore and projecting from said frame between said legs, and means for locking said plunger in said bore, the portion of said frame between said legs having an outer surface perpendicular to the axis of said bore located so as to include the line at which said leg surfaces would intersect if projected.

2. A shaft measuring device comprising a rigid frame having a pair of spaced legs adapted to straddle a portion of said shaft and each having a planar inner surface, said leg surfaces being displaced 60° from each other, the central portion of said frame between said legs having a bore equispaced from said legs with its axis equiangularly displaced from said inner leg faces, a plunger slidable in said bore, and means for locking said plunger in said bore, the central portion of said frame having an outer surface perpendicular to the axis of said bore located so as to include the line at which said leg surfaces would intersect if projected, and a spring in said bore normally urging said plunger outwardly.

3. A shaft measuring device comprising a rigid frame having a pair of spaced legs adapted to straddle a portion of said shaft, said legs having planar inner surfaces displaced 60° from each other, the portion of said frame between said legs having an outer transverse plane surface equiangularly related to the planes of said leg surfaces and located so as to include the line at which said leg surfaces would intersect if projected, and a plunger shiftably carried by the frame and centrally positioned between said legs, said plunger being shiftable in a path equiangularly displaced from said leg surfaces.

4. A shaft measuring device comprising a rigid frame having a pair of spaced legs adapted to straddle a portion of said shaft, said legs having planar inner surfaces displaced 60° from each other, the portion of said frame between said legs having an outer transverse plane surface equiangularly related to the planes of said leg surfaces and located so as to include the line at which said leg surfaces would intersect if projected, and a plunger shiftably carried by the frame and centrally positioned between said legs, said plunger being shiftable in a path equiangularly displaced from said leg surfaces, and means for locking said plunger in any selected position in said path.

5. A shaft measuring device comprising a rigid substantially V-shaped member having inner shaft-engaging plane surfaces displaced 60° from each other and a central outer transverse surface which includes the line at which the planes of said first named surfaces intersect and which is perpendicular to the bisector of the included angle of intersection of said first-named surfaces, and a plunger carried by the central portion of said frame and longitudinally shiftable in a path being in the plane bisecting the included angle between said first named surfaces.

6. A shaft measuring device comprising a rigid substantially V-shaped member having inner shaft-engaging plane surfaces displaced 60° from each other and a central outer transverse surface which includes the line at which the planes of said first named surfaces intersect and which is perpendicular to the bisector of the included angle of intersection of said first-named surfaces, and a plunger carried by said frame and shiftable in a path between and displaced 30° from said first named surfaces.

7. A shaft measuring device comprising a rigid substantially V-shaped member having inner shaft-engaging plane surfaces displaced 60° from each other and a central outer transverse surface which includes the line at which the planes of said first named surfaces intersect and which is perpendicular to the bisector of the included angle of intersection of said first-named surfaces, and a plunger carried by said frame and shiftable in a path between and displaced 30° from said first named surfaces, a spring normally pressing said plunger in shaft-engaging direction, and means for locking said plunger in selected position against the action of said spring.

8. A shaft measuring device comprising a rigid substantially V-shaped member having inner planar shaft-engaging surfaces displaced 60° from each other and a central outer transverse surface which includes the line at which the planes of said first named surfaces intersect and which is perpendicular to the bisector of the included angle of intersection of said first-named surfaces, said member having a bore whose axis is equispaced from and displaced 30° from said first named surfaces, a second bore branching transversely therefrom and a third bore branching transversely from said second bore and including a threaded portion, an outwardly spring pressed plunger longitudinally slidable in said first bore, a pin slidable longitudinally in said second bore with one end portion projecting into the outline of the third bore, and a locking member threaded in the last named bore and having a conical abutment engaging the end of said pin.

GEORGE E. FRISZ.

REFERENCES CITED

The following references are of record in the file of this patent:

UNITED STATES PATENTS

| Number | Name | Date |
| --- | --- | --- |
| 181,809 | Williams | Sept. 5, 1876 |
| 937,662 | Wahlberg | Oct. 19, 1909 |
| 1,398,296 | Goquen et al. | Nov. 29, 1921 |
| 2,165,881 | Bennett | July 11, 1939 |

FOREIGN PATENTS

| Number | Country | Date |
| --- | --- | --- |
| 6,055 | Great Britain | Mar. 16, 1903 |
| 6,566 | Great Britain | Mar. 17, 1913 |
| 330,932 | France | July 15, 1903 |
| 487,375 | Great Britain | June 20, 1938 |
| 708,341 | France | Apr. 28, 1931 |